United States Patent
Sennett et al.

(10) Patent No.: US 9,153,117 B2
(45) Date of Patent: *Oct. 6, 2015

(54) SYSTEMS AND METHODS FOR ACTIVATING A SECURITY SYSTEM UPON RECEIPT OF EMERGENCY ALERT MESSAGES

(71) Applicant: AT&T Mobility II LLC, Atlanta, GA (US)

(72) Inventors: DeWayne Allan Sennett, Redmond, WA (US); Brian Kevin Daly, Peachtree Corners, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/964,646

(22) Filed: Aug. 12, 2013

(65) Prior Publication Data
US 2013/0328679 A1    Dec. 12, 2013

Related U.S. Application Data

(63) Continuation of application No. 12/056,650, filed on Mar. 27, 2008, now Pat. No. 8,526,909.

(51) Int. Cl.
| | |
|---|---|
| *H04M 11/04* | (2006.01) |
| *G08B 21/18* | (2006.01) |
| *G08B 27/00* | (2006.01) |
| *H04W 4/22* | (2009.01) |
| *H04W 76/00* | (2009.01) |
| *H04W 4/12* | (2009.01) |

(52) U.S. Cl.
CPC .............. *G08B 21/18* (2013.01); *G08B 27/006* (2013.01); *H04W 4/22* (2013.01); *H04W 76/007* (2013.01); *H04M 11/04* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 6,112,075 A | 8/2000 | Weiser | |
| 6,463,273 B1 | 10/2002 | Day | |
| 6,646,559 B2 | 11/2003 | Smith | |
| 7,113,090 B1 | 9/2006 | Saylor et al. | |
| 7,480,501 B2 | 1/2009 | Petite | |
| 7,616,942 B2 | 11/2009 | Karl et al. | |
| 7,755,472 B2 | 7/2010 | Grossman | |
| 8,526,909 B2 * | 9/2013 | Sennett et al. | ............. 455/404.1 |
| 2003/0069002 A1 | 4/2003 | Hunter et al. | |
| 2006/0040639 A1 | 2/2006 | Karl et al. | |

* cited by examiner

Primary Examiner — Willie J Daniel, Jr.
(74) Attorney, Agent, or Firm — Baker & Hostetler LLP

(57) ABSTRACT

An Emergency Alert System (EAS) alert message may be used to activate a security system. For example, a mobile device of a subscriber may receive an EAS alert message from a network provider of the mobile device. Upon receipt of the EAS alert message, the mobile device may send an indication of the EAS message to the security system. A component of the security system may be activated to provide notification of the EAS alert message to the subscriber.

19 Claims, 6 Drawing Sheets

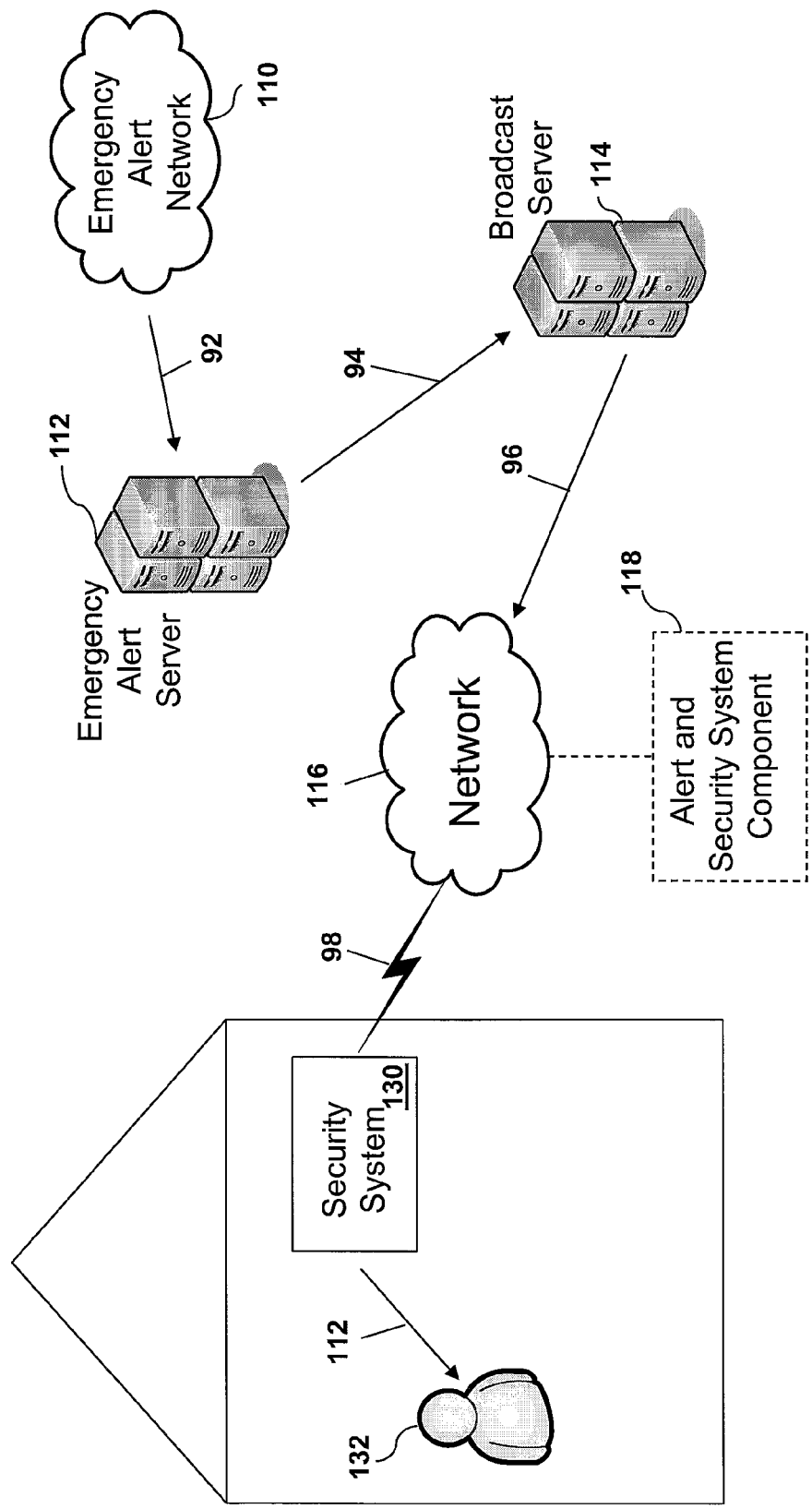

SYSTEMS AND METHODS FOR ACTIVATING A SECURITY SYSTEM UPON RECEIPT OF EMERGENCY ALERT MESSAGES

CROSS-REFERENCE TO RELATED APPLICATIONS

The instant application is a continuation of, and claims priority to, U.S. patent application Ser. No. 12/056,650, filed Mar. 27, 2008. U.S. patent application Ser. No. 12/056,650 is hereby incorporated by reference herein in its entirety.

BACKGROUND

The Emergency Alert System (EAS) typically provides messages indicative of a variety of types of alerts including, for example, weather conditions, disasters, AMBER (America's Missing: Broadcast Emergency Response) alerts, and/or alerts issued by the Government, for example. Currently, EAS alert messages may be provided to, for example, a mobile device of a subscriber such that the EAS alert message may be broadcast to the subscriber via the mobile device. Unfortunately, the mobile device may be inaccessible to provide the EAS alert message to the subscriber. For example, the mobile device or the ringer may be turned off. Additionally, in the middle of the night, the mobile device may not be loud enough to alert the subscriber. Thus, the subscriber may not be properly informed of an EAS alert message.

SUMMARY

Emergency Alert System (EAS) alert messages may be used to activate a security system of a subscriber. For example, an alert message may be received by a device such as a cellular telephone, a Personal Data Assistant (PDA), a computer, a modem, a gateway, a router, or the like of the subscriber. Upon receipt of the alert message, the device may activate the security system of the subscriber. According to an example embodiment, the device may determine whether to activate the security system. For example, the device may determine whether an interface therein may be configured to output the alert message. The device may also determine whether, at the time of receipt of the alert message, the device should output the alert message via the interface. Additionally, a network provider associated with the device of the subscriber may determine whether to provide the alert message to the device or whether to activate the security system. For example, if the network provider may not establish a communication session with the device, the network provider may activate the security system to provide the alert message to the subscriber.

BRIEF DESCRIPTION OF THE DRAWINGS

The foregoing and other objects, aspects and advantages of configuring EAS alert message notification will be better understood from the following detailed description with reference to the drawings.

FIGS. 1A and 1B depict an example system and example processes for activating a security system upon receipt of alert messages.

DETAILED DESCRIPTION OF ILLUSTRATIVE EMBODIMENTS

As will be described herein, Emergency Alert System (EAS) alert messages may be broadcast to a device such as a cellular telephone, a Personal Data Assistant (PDA), a computer, a modem, a gateway, a router, or the like. In an example embodiment, upon receipt of an EAS alert message, the device may activate a security system to provide notification of the EAS alert message to a subscriber. For example, the device may send a signal to the security system that may set off the alarm of the security system. Additionally, the device may provide the EAS alert message to the security system such that security system may render the EAS alert message via a component of the security system. According to an example embodiment, the device may determine whether to activate the security system and/or whether to output the EAS alert message via an interface therein. For example, the device may determine whether the interface may be configured, working, or enabled to output the alert message. The device may also determine whether, at the time of receipt of the alert message, the device should output the alert message via the interface. If the device determines that the interface may not be configured, working, or enabled to output the EAS alert message and/or that the device should not output the EAS alert message, the device may activate the security system to provide notification of the EAS alert message to the subscriber. According to another embodiment, a network provider of the device may determine whether to activate the security system. For example, if a network operated by the network provider may not establish a connection to the device, a network component of the network provider may activate the security system to provide notification to the subscriber of the EAS alert message.

Figure 1A:
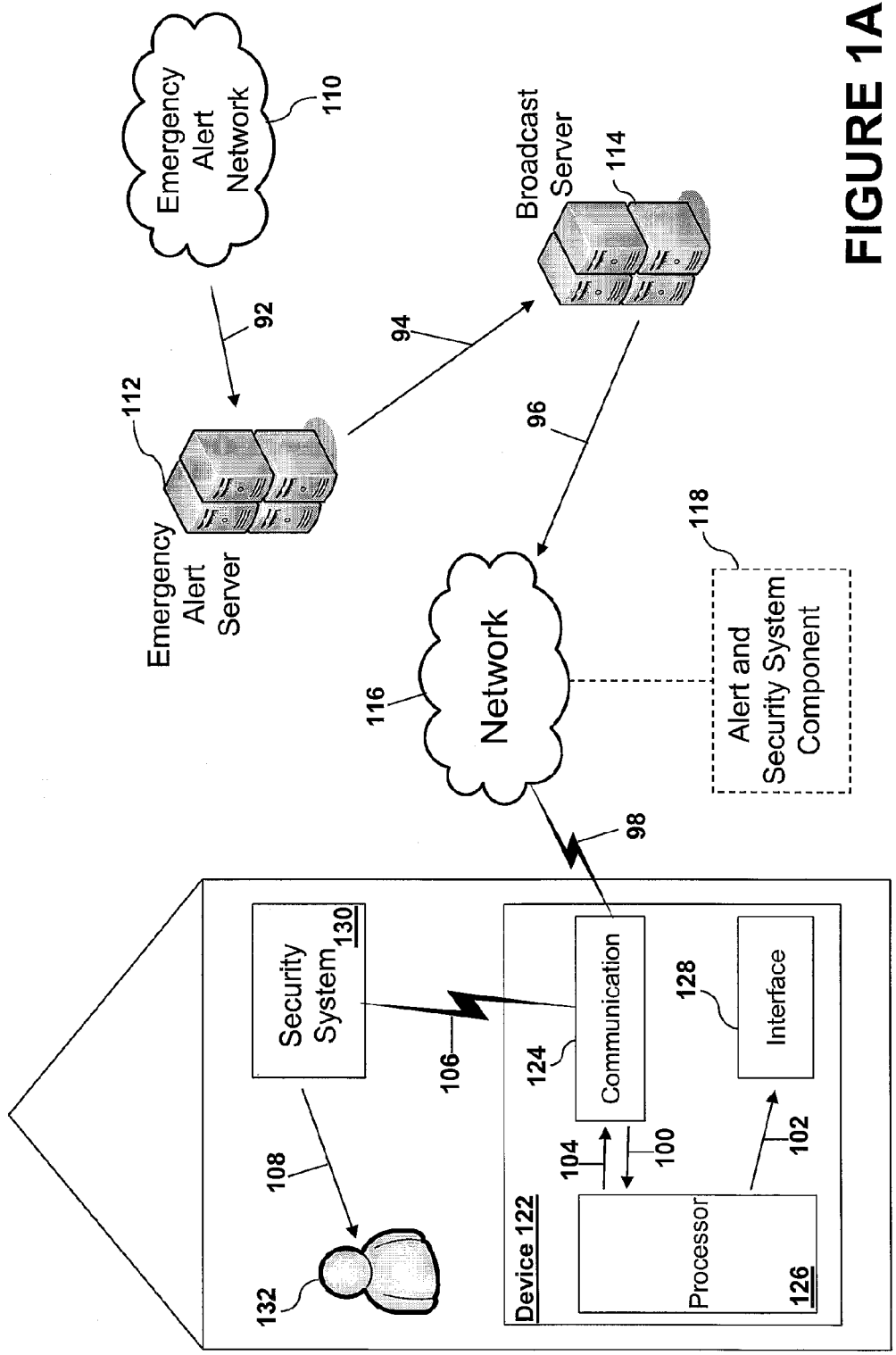

FIGS. 1A and 1B depict an example system and example processes for activating a security system upon receipt of alert messages. For example, an EAS alert message may be generated and provided, at 92, via an emergency alert network 110, to an emergency alert server 112. The EAS alert message may include general alert types such as general weather alerts, general natural disaster alerts, general government alerts, or the like and/or a specific alert types such as child abduction (e.g., AMBER—America's Missing: Broadcast Emergency Response), geophysical e.g., landslide, meteorological (e.g., windstorm, tornado, hurricane, tsunami, lightning storms, thunderstorms, hurricanes, freezing rain, blizzards, fog), general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test, or the like. The EAS alert message may also include alert severity levels such as warnings, watches, advisories, or the like that may be associated with each alert type, for example. At 94, the EAS alert message may be provided by the emergency alert server 112 to a broadcast server 114.

At 96, the broadcast server 114 may then provide the EAS alert message to a network 116. The network 116 may include may be any type of communication network such as the internet, a Local Area Network (LAN), a Wide Area Network (WAN), a cellular telephone network, or the like. For example, the network 116 may include the example networks described below in FIGS. 3-5 such as GSM, UMTS, CDMA, WiFi, WiMax, EDGE, or the like. The network 116 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like.

According to one embodiment, the network 116 may provide the EAS alert message to a device 122 at 98. For example, if the network 116 establishes a communication session with the device 122, the network provider may broadcast the EAS alert message to the device 122 at 98. The device 122 may be representative of any appropriate type of device that may be utilized to receive an alert message, render and output the alert message in a suitable format to the subscriber, and/or activate a security system. For example, in one embodiment, the device 122 may be any type of receiver or transceiver device with broadcast reception capabilities (e.g., cell phone, pager, PDA, PC, modem, router, gateway, specialized broadcast receiving device, first responder Mobile Data Terminal (MDT), FM/AM radio, NOAA weather radio, Land Mobile Radio (LMR), satellite radio receiver, satellite phone, and television). According to other example embodiments, the device 122 may also be any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The device 122 may include hardware components such as a processor, a graphics card, a storage component, a memory component, an antenna, a communication component, an interface such as a speaker, display, or the like. The device 122 may also include software components such as an operating system that may control the hardware components.

In one embodiment, the device 122 may include a communication component 124, a processor 126, and an interface 128. The communication component 124 may include an antenna, communication port, or the like that may be used to establish a communication session with the network 116. If a communication session may be established between the network 116 and the communication component 124, for example, the EAS alert message and/or a notification of the EAS alert message may be provided to the device 122 by the network 116 at 98.

The EAS alert message may then be provided to the processor 126, via the communication component 124, at 100. The processor 126 may include any appropriate type of processor such as a single processor, multiple processors that may be distributed or centrally located, or the like. For example, the processor 126 may be a mobile communications device processor, a computer processor, a handheld processors, or the like. The processor 126 may also include any other suitable hardware such as cache, Random Access Memory, storage devices, or the like and/or software.

Upon receipt of the EAS alert message, at 100, the processor 126 may determine whether to activate a security system such as the security system 130. For example, the processor 126 may determine whether an interface such as the interface 128 may be configured to render the EAS alert message. The interface 128 may include software, hardware such as a speaker, a display, a light, or any other suitable component that may provide notification to a subscriber of an alert message. The processor 126 may determine whether the interface 128 may be turned on, activated, or the like such that the interface 128 may provide notification of the EAS alert message received by the device 122. For example, the interface 128 may include a speaker, the processor 126 may determine whether the volume of the speaker may be at a sufficient level to provide notification of the EAS alert message received at 100.

If the interface 128 may be configured to render the EAS alert message, the processor 126 may provide the EAS alert message to the interface 128 at 102. The interface 128 may then render the alert message and output the alert message in, for example, an audio format, a visual format, and/or any other suitable format to the subscriber.

Additionally, upon receipt of the EAS alert message at 100, the processor 126 may determine whether a system characteristic such as the current time, current location, or the like that may be registered by the device 122 indicates that the device 122 should activate a security system such as the security system 130. For example, the processor 126 may compare the current time registered by the device 122 with a time range that indicates when to activate the security system. According to one embodiment, if the current time falls outside the time range that indicates when to activate the security system, the processor 126, at 102, may provide the EAS alert message to the interface 128 if the interface 128 may be configured to render the EAS alert message.

The processor 126 may also determine whether a configuration that may be established by a subscriber such as the subscriber 132 indicates that the device 122 should activate a security system such as the security system 130. For example, each alert message may include a message type and/or a message severity that may be embodied as a vector, metadata, a header, embedded data, or the like packaged therewith. The subscriber and/or the network provider may establish a configuration that may include each message type and/or message severity that should activate the security system. Upon receipt of the EAS alert message at 100, the processor 126 may extract the vector, metadata, header, embedded data, or the like and compare the extracted vector, metadata, header, embedded data, or the like associated of the EAS alert message with one or more message types and/or message severities that may be established in the configuration. If the message type of the EAS alert message received, at 100, does not correspond with a message type and/or a message severity in the configuration, the processor 126, at 102, may provide the EAS alert message to the interface 128 if the interface may be configured to render the EAS alert message.

If the interface 128 may not be configured to render the EAS alert message and/or the processor 126 determines that a system characteristic and/or configuration indicates the security system should be activated, the processor 126 may activate a security system to provide notification of the EAS alert message. For example, if the interface 128 may not be configured (e.g. turned off, low volume, or the like), the processor 126 may provide an activation indication and/or the EAS alert message to the communication component 124 at 104. Additionally, if current time registered by the device may be within the time range that indicates when to activate the security system or the message type and/or message severity associated with the EAS alert message corresponds to a message type and/or message severity in a configuration, the processor 126 may provide an activation indication and/or the EAS alert message to the communication component 124 at 104. The communication component 124 may be in operative communication with the security system 130 such that the communication component 124 may transmit and/or provide the activation indication and/or the EAS alert message received, at 104, to the security system 130 at 106. According to example embodiments, the device 122 may be in communication with the security system 130, via the communication component 124, by any wired or wireless technology including Internet connectivity, WiFi, Ethernet cables, Bluetooth protocol, or the like.

Upon receipt of the activation indication and/or the EAS alert message at 106, the security system 130 may be activated to provide notification of the EAS to a subscriber 132 at 108. The security system 130 may include an alarm component, an intercom component, a light component, or the like. According to one embodiment, upon receipt of the indication and/or the EAS alert message at 106, the alarm component of the security system 130 may be activated to produce, for example, an alarm audio sound to the subscriber 132 at 108. Additionally, the intercom component of the security system 130 may be activated to render broadcast an audio message associated with the EAS alert message. Thus, the security system 130 may render the alert message and output the alert message via a component such as an alarm component, an intercom component, a light component, or the like in, for example, an audio format, a visual format, and/or any other suitable format to provide notification of the EAS alert message to the subscriber 132 at 108.

According to another example embodiment, as shown in FIG. 1B, the network 116 may provide the EAS alert message and/or an indication of the EAS alert message directly to the security system 130 at 98. For example, the network 116 may determine whether to broadcast the EAS alert message received at 96 to the device 122, as described above, or to activate the security system 130. In one embodiment, the network 116 may include hardware and/or software components such an alert and security system 118 that may be used to determine whether to provide the EAS alert message to the device 122 or whether to activate the security system 130, which will be described in more detail below. If the network 116 determines to directly activate the security system 130, upon receipt of the indication and/or the EAS alert message, a component such as an alarm component, an intercom component, a light component, or the like of the security system 130 may be activated to provide notification of the EAS alert message to the subscriber 132 at 108, as described above.

Figure 2:
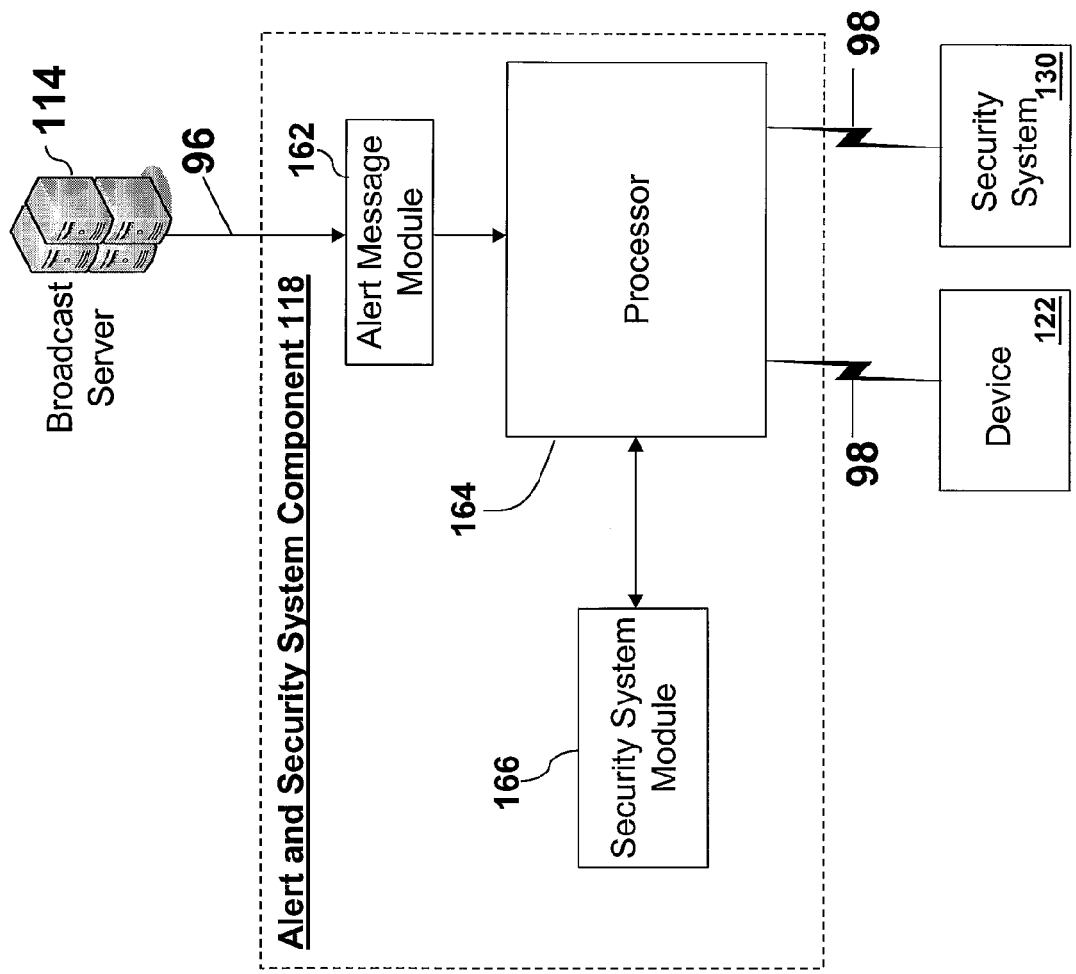
FIG. 2 depicts an example embodiment of an alert and security system component that may determine whether to activate a security system upon receipt of alert messages.

FIG. 2 depicts an example embodiment of an alert and security system component that may be used to determine whether to activate a security system upon receipt of alert messages. The security system component 118 may be implemented as an independent component that may be in operative communication with other components of the network 116 such as the MSC, the HLR, or the like described below in FIGS. 3-5. Alternatively, the alert and configuration system 118 may be implemented as a component within the MSC, the HLR, or the like as described below in FIGS. 3-5. For example, the alert and configuration system may be a feature added to HLR 774 depicted in FIG. 4. Additionally, the functionality of the security system component 118 may be performed by any suitable hardware and/or software or any combination thereof within HLR 774, for example.

Thus, according to example embodiments, the alert and security system component 118 may be implemented using a variety of techniques and hardware components including, but not limited to, servers, databases, microchips, storage devices, processors, or programmed modules. Furthermore, as described above, the alert and security system component 118 may be implemented as an independent component of the network 116, as a separate component within existing components in the network 116, and/or using existing components within the network 116.

As shown in FIG. 2, the alert and security system component 118 may include an alert message module 162. The alert message module 162 may store messages received from the emergency alert network. For example, the alert message module 162 may store the alert message provided to the network 116, at 96, from broadcast server 114. The alert message module 162 may include, for example, RAM memory chips, registers, hard drives, or any suitable hardware designed to store data. Thus, the alert message module 162 may be in operative communication with the broadcast server 114 such that the alert message module 162 may receive and store alert messages including the message type and/or message severity of each EAS alert message provided by the broadcast server 114, at 96, as described above. For example, the alert message module 162 may receive and store alert messages and message types including, but not limited to, thunderstorm alerts, hurricane alerts, terror alerts, volcano alerts, presidential alerts, forest fire alerts, AMBER alerts, or the like and message severities such as warnings, watches, advisories, or the like.

The alert and security system component 118 may further include a security system module 166. According to one embodiment, the security system module 166 may be configured to store information such as an identifier, activation indications, components, or the like that may associated with a security system such as the security system 130 of a subscriber such as subscriber 132, shown in FIGS. 1A and 1B. The security system module 166 may further be configured to store information such as a configuration that may be established by the subscriber, the network provider, or the like, a characteristic such as the current time, location, or the like of the security system 130 and/or the device 122, and/or communication information that may indicate whether a communication session may be established with the device 122. For example, the security system module 166 may include a database, RAM memory chips, registers, hard drives, or any suitable hardware designed to store data. According to one embodiment, the security system module 166 may be in operative communication with the HLR, the MSC, or any other components of the network, as described below in FIGS. 3-5, such that the security system module 166 may be updated by the network provider with additional configurations, characteristics, communication information, or the like that may be used to determine whether to provide an alert message to the device and/or whether to activate a security system.

The alert and security system component 118 may also include a processor component 164. The processor component 164 may be in operative communication with the alert message module 162 and the security system module 166, as shown in FIG. 2. The processor component 164 may include, for example, a standard processor, a specialized processor, or the like. The processor component 164 may engage in an analysis to determine whether to provide the alert message received at 96 to the device 122 at 98 or whether to activate the security system 130 at 98. According to one embodiment, the processor component 164 may extract a message type and/or message severity such as a vector, metadata, data, and/or information from the alert message received at 96 and stored in the alert message module 162. The processor component 164 may compare the message type and/or the message severity stored in the alert message module 162 with the message types and/or message severities in a configuration associated with a subscriber that may be stored in the security system module 166. If the message type and/or message of the EAS alert message received at 96 does not match at least one message type and/or message severity in the configuration, the processor component 164 may provide the EAS alert message received at 96 to the device 122 at 98. If the message type and/or message severity of the EAS alert message received at 96 matches at least one message type and/or message severity in the configuration, the processor component 164 may activate the security system 130 at 98.

Additionally, the processor component 164 may compare a characteristic such as the current time, location, or the like of the device and/or security system with information such as a time range, a range for the location of device and/or security system, or the like that may be stored in the security system module 166. If the characteristic such as the current system time falls within, for example, the time range, the processor component 164 may activate the security system 130 at 98. If the characteristic such as the current system time falls outside, for example, the time range, the processor component 164 may provide the EAS alert message received at 96 to the device 122 at 98.

According to one embodiment, the processor component 164 may determine whether to provide the EAS alert message stored in, for example, the alert message module 162 at 96 to the device 122 or whether the to activate the security system 130 based on the communication information that may be stored in, for example, the security system module 166. If, based on the communication information, a communication session, for example, may not be established with the device 122 (e.g. the device 122 may be turned off), the processor component 164 may directly activate the security system 130 at 98.

If the processor component 164 determines to activate the security system 130 at 98, the processor component 164 may use the security system information such as the model, identifier, or the like of the security system that may be stored in the security system module 166 to determine the appropriate activation indication to transmit to the security system 130 at 98.

The following description sets forth some exemplary telephony radio networks and non-limiting operating environments for broadcasting secure messages. The below-described operating environments should be considered non-exhaustive, however, and thus the below-described network architectures merely show how EAS alert messages may be incorporated into existing network structures and architectures. It may be appreciated, however, that EAS alert messages may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS alert messages may be applied independently of the method for data transport, and do not depend on any particular network architecture, or underlying protocols.

Figure 3:
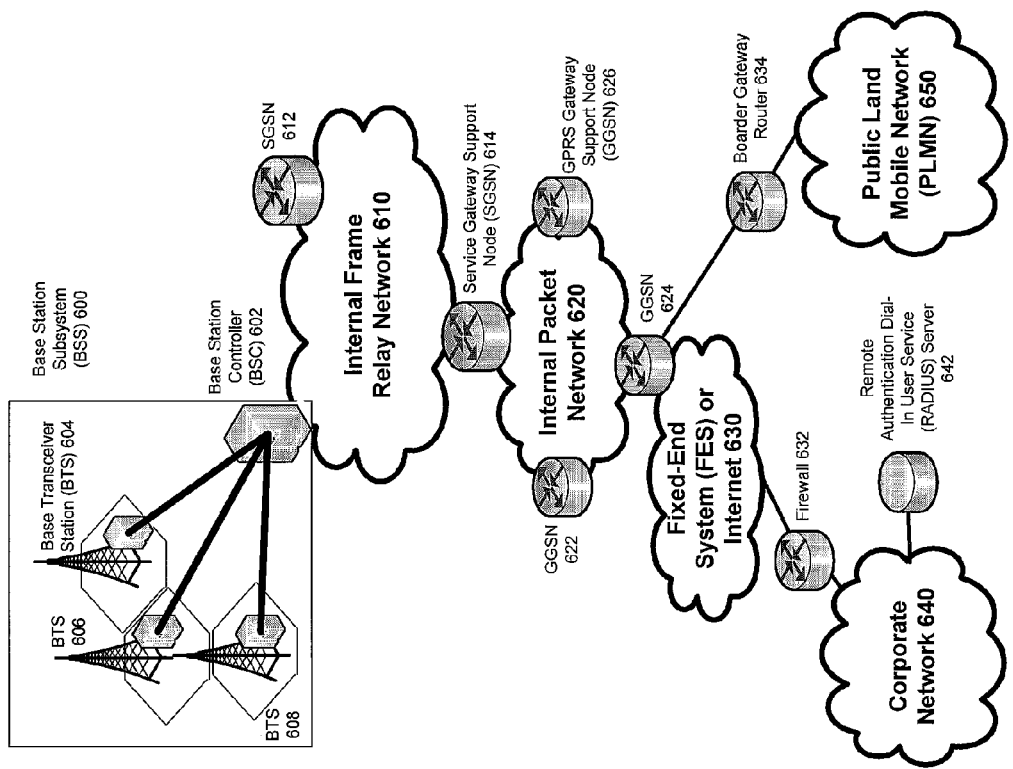
FIG. 3 depicts an overall block diagram of an exemplary packet-based mobile cellular network environment, such as a GPRS network, that may be used to activate a security system upon receipt of an alert message.

FIG. 3 depicts an overall block diagram of an exemplary packet-based mobile cellular network environment, such as a GPRS network, that may be used to activate a security system upon receipt of an alert message. In an example configuration, the emergency alert network 110 and/or the network 116 may be encompassed by the network environment depicted in FIG. 3. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
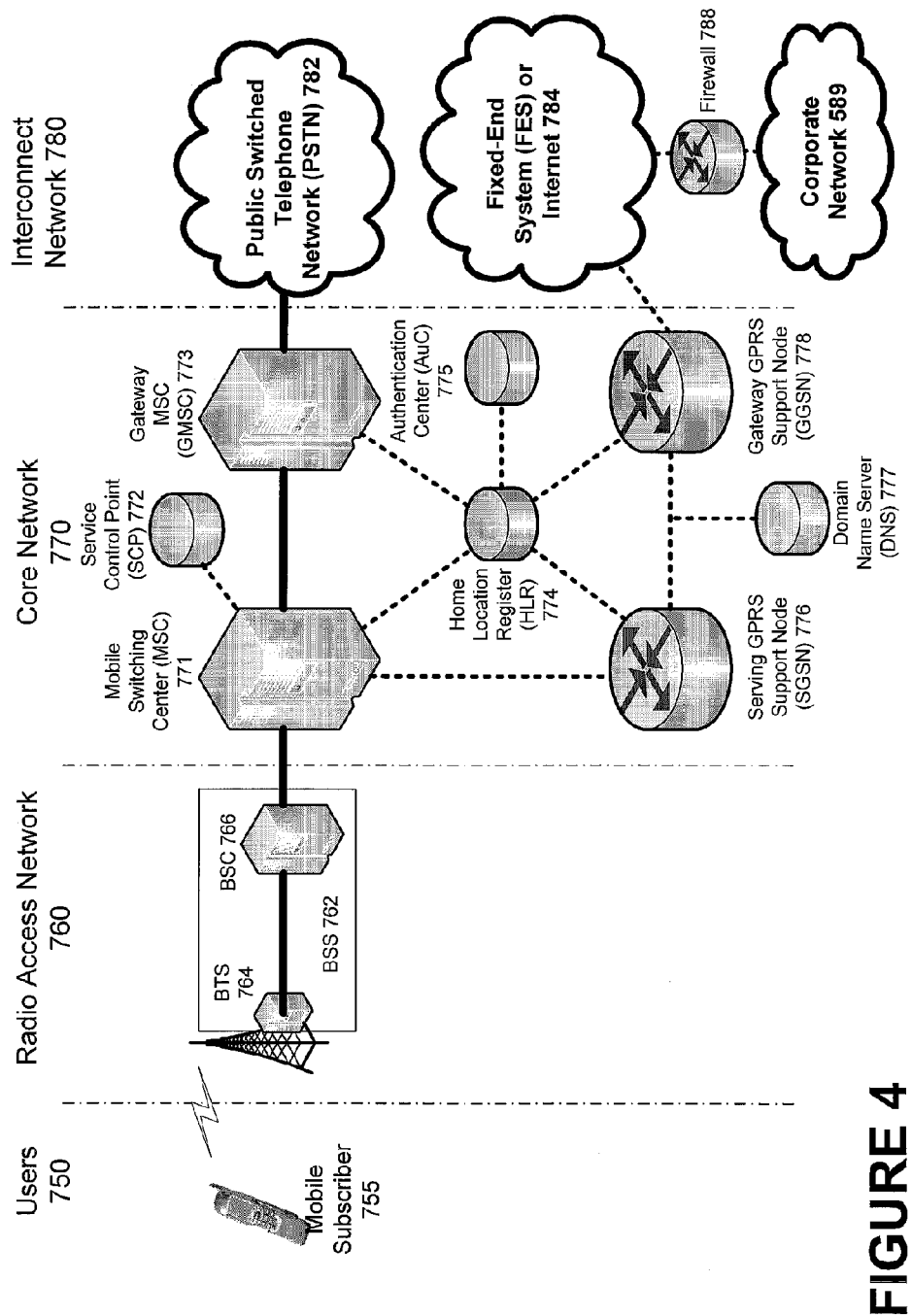
FIG. 4 illustrates an architecture of a typical GPRS network as segmented into four groups.

FIG. 4 illustrates an architecture of a typical GPRS network as segmented into four groups: users 750, radio access network 760, core network 770, and interconnect network 780. In an example configuration the emergency alert network 110, and the network 116 are encompassed by the radio access network 760, core network 770, and interconnect network 780. Users 750 comprise a plurality of end users (though only mobile subscriber 755 is shown in FIG. 4). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 4, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the device 122, used by an end user of the mobile cellular service. When a mobile subscriber turns on his or her mobile device, the mobile device goes through an attach process by which the mobile device attaches to an SGSN of the GPRS network. In FIG. 4, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 4) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of a configuration based EAS alert message may include but are not limited to Gateway GPRS Support Node tables, Fixed End System router tables, firewall systems, VPN tunnels, and any number of other network elements as required by the particular digital network.

Figure 5:
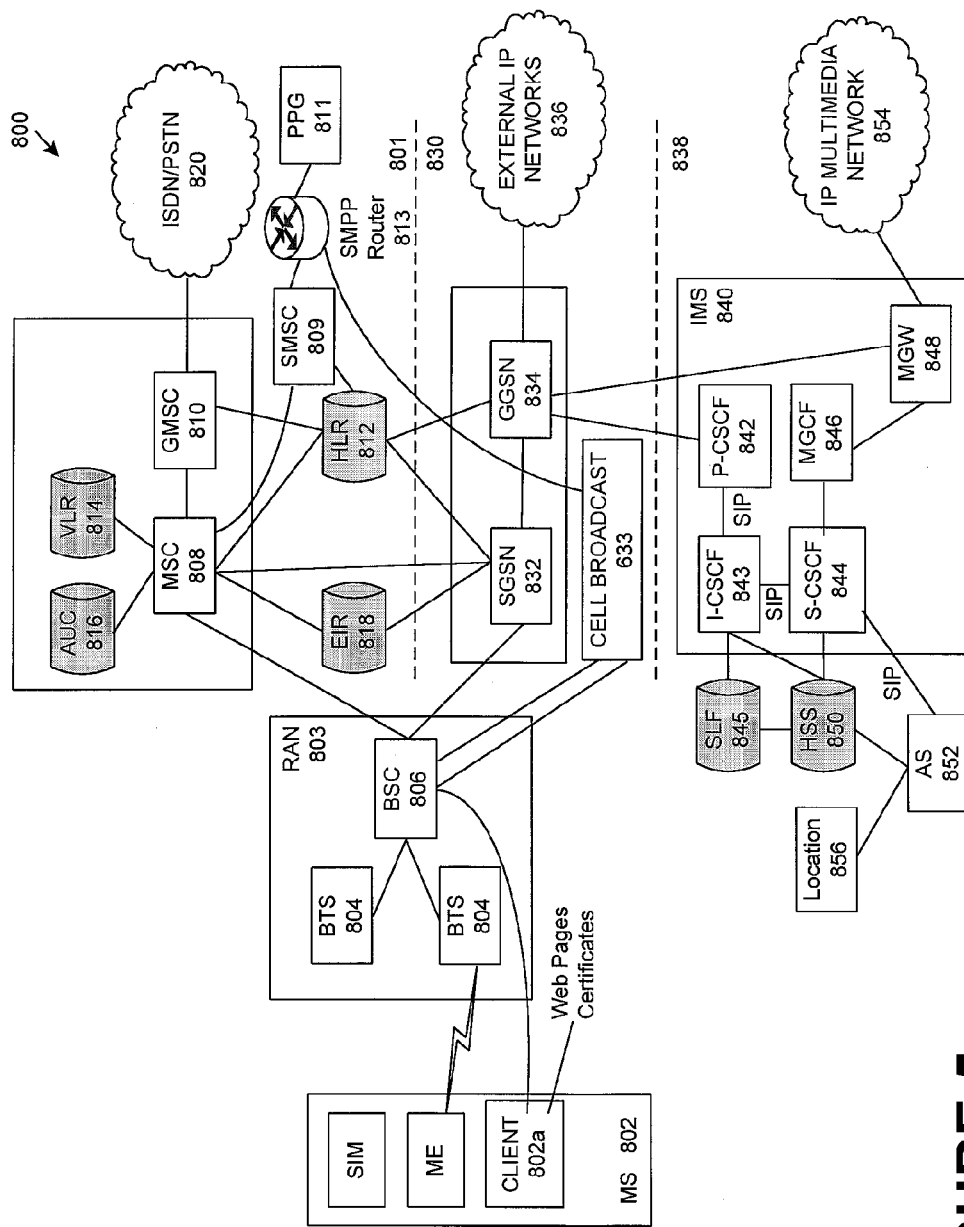
FIG. 5 illustrates an example alternate block diagram of an exemplary GSM/GPRS/IP multimedia network architecture that may be used to activate a security system upon receipt of an alert message.

FIG. 5 illustrates another exemplary block diagram view of a GSM/GPRS/IP multimedia network architecture 800 that may be used to activate a security system upon receipt of an alert message. As illustrated, architecture 800 of FIG. 5 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSCNLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while received data and vice versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of activating a security system upon receipt of an EAS alert message have been described in connection with various computing devices, the underlying concepts may be applied to any computing device or system capable of activating a security system upon receipt of an EAS alert message. The various techniques described herein may be implemented in connection with hardware or software or, where appropriate, with a combination of both. Thus, the methods and apparatus of activating a security system upon receipt of an EAS alert message, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer. In the case of program code execution on programmable computers, the computing device may include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus activating a security system upon receipt of an EAS alert message also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, such that the machine may become an apparatus for activating a security system upon receipt of an EAS alert message. When implemented on a general-purpose processor, the program code may combine with the processor to provide a unique apparatus that may operate to invoke the functionality of activating a security system upon receipt of an EAS alert message. Additionally, any storage techniques used in connection with an EAS alert message may invariably be a combination of hardware and software.

While activating a security system upon receipt of an EAS alert message has been described in connection with the various embodiments of the various figures, it is to be understood that other similar embodiments may be used or modifications and additions may be made to the described embodiment for performing the same functions described herein. For example, one skilled in the art will recognize that a system for activating a security system upon receipt of an EAS alert message as described may apply to any environment, whether wired or wireless, and may be applied to any number of devices connected via a communications network and interacting across the network.

What is claimed is:

1. A method comprising:
    determining whether a mobile device is configured to render a received broadcasted alert message;
    determining a current location of the mobile device;
    determining a current location of a security system, wherein the mobile device and the security system are separate entities;
    determining if the current location of the mobile device and the current location of the security system are within a range of locations wherein the security system is to be activated; and
    activating the security system, via the mobile device, to provide a notification of the broadcasted alert message via the security system, when it is determined that:
        the mobile device is not configured to render the received broadcasted alert message; and
        the current locations of the mobile device and the security system are within a range of locations wherein the security system is to be activated.

2. The method of claim 1, wherein activating the security system comprises activating a component associated with the security system.

3. The method of claim 1, wherein activating the security system comprises activating at least one of an alarm, an intercom, or a light.

4. The method of claim 1, wherein activating the security system comprises providing an activation indication of the broadcasted alert message to the security system.

5. The method of claim 1, wherein activating the security system comprises providing the broadcasted alert message to the security system, wherein the security system renders the broadcasted alert message.

6. The method of claim 1, wherein activating the security system is further based on whether a current time is indicative of a time range during which the security system is to be activated.

7. An apparatus comprising:
a processor; and
memory coupled to the processor, the memory comprising executable instructions that when executed by the processor cause the processor to effectuate operations comprising:
determining whether a mobile device is configured to render a received broadcasted alert message;
determining a current location of the mobile device;
determining a current location of a security system, wherein the mobile device and the security system are separate entities;
determining if the current location of the mobile device and the current location of the security system are within a range of locations wherein the security system is to be activated; and
activating the security system, via the mobile device, to provide a notification of the broadcasted alert message via the security system, when it is determined that:
the mobile device is not configured to render the received broadcasted alert message; and
the current locations of the mobile device and the security system are within a range of locations wherein the security system is to be activated.

8. The apparatus of claim 7, wherein activating the security system comprises activating a component associated with the security system.

9. The apparatus of claim 7, wherein activating the security system comprises activating at least one of an alarm, an intercom, or a light.

10. The apparatus of claim 7, wherein activating the security system comprises providing an activation indication of the broadcasted alert message to the security system.

11. The apparatus of claim 7, wherein activating the security system comprises providing the broadcasted alert message to the security system, wherein the security system renders the broadcasted alert message.

12. The apparatus of claim 7, wherein activating the security system is further based on whether a current time is indicative of a time range during which the security system is to be activated.

13. The apparatus of claim 7, wherein the apparatus comprises a network entity.

14. A computer-readable storage medium that is not a propagating signal, the computer-readable storage medium comprising executable instructions that when executed by a processor cause the processor to effectuate operations comprising:
determining whether a mobile device is configured to render a received broadcasted alert message;
determining a current location of the mobile device;
determining a current location of a security system, wherein the mobile device and the security system are separate entities;
determining if the current location of the mobile device and the current location of the security system are within a range of locations wherein the security system is to be activated; and
activating the security system, via the mobile device, to provide a notification of the broadcasted alert message via the security system, when it is determined that:
the mobile device is not configured to render the received broadcasted alert message; and
the current locations of the mobile device and the security system are within a range of locations wherein the security system is to be activated.

15. The computer-readable storage medium of claim 14, wherein activating the security system comprises activating a component associated with the security system.

16. The computer-readable storage medium of claim 14, wherein activating the security system comprises activating at least one of an alarm, an intercom, or a light.

17. The computer-readable storage medium of claim 14, wherein activating the security system comprises providing an activation indication of the broadcasted alert message to the security system.

18. The computer-readable storage medium of claim 14, wherein activating the security system comprises providing the broadcasted alert message to the security system, wherein the security system renders the broadcasted alert message.

19. The computer-readable storage medium of claim 14, wherein activating the security system is further based on whether a current time is indicative of a time range during which the security system is to be activated.

* * * * *